(12) United States Patent
Bansal et al.

(10) Patent No.: US 10,929,367 B2
(45) Date of Patent: Feb. 23, 2021

(54) AUTOMATIC REARRANGEMENT OF PROCESS FLOWS IN A DATABASE SYSTEM

(71) Applicant: salesforce.com, inc., San Francisco, CA (US)

(72) Inventors: Ankush Bansal, San Francisco, CA (US); Priya Mittal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 150 days.

(21) Appl. No.: 16/177,385

(22) Filed: Oct. 31, 2018

(65) Prior Publication Data

US 2020/0134059 A1  Apr. 30, 2020

(51) Int. Cl.
  *G06F 17/30* (2006.01)
  *G06F 16/22* (2019.01)
  *G06F 16/13* (2019.01)
  *G06F 16/21* (2019.01)

(52) U.S. Cl.
  CPC .......... *G06F 16/2246* (2019.01); *G06F 16/13* (2019.01); *G06F 16/21* (2019.01)

(58) Field of Classification Search
  CPC .......... G06F 16/13; G06F 16/21; G06F 16/24; G06F 16/40; G06F 16/156
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

OTHER PUBLICATIONS

Restriction Requirement for U.S. Appl. No. 16/177,352 dated Jan. 13, 2020, 5 pages.

(Continued)

*Primary Examiner* — Hung D Le
(74) *Attorney, Agent, or Firm* — Jaffery Watson Mendonsa & Hamilton LLP

(57) ABSTRACT

Embodiments regard transfer of data streaming services to provide continuous data flow. An embodiment of an apparatus includes one or more processors to process data for database operation and a database storage, wherein the system is to: receive one or more process flows, each process flow including a plurality of nodes and including one or more flows between each of the plurality of nodes and another node of the plurality of nodes; and upon receipt of a request, automatically rearrange the one or more process flows, including the apparatus to evaluate a first process flow including traversing of each node of the first process flow, and generate a rearranged process flow based on the first process flow, including establishing a level and coordinate position for each node of first process flow, and establishing a logical direction for each flow between the plurality of nodes of the first process flow.

21 Claims, 26 Drawing Sheets

(56) References Cited

U.S. PATENT DOCUMENTS

| | | | |
|---|---|---|---|
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,463,346 B1 * | 10/2002 | Flockhart | G06Q 10/10 379/266.01 |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0060898 A1 * | 3/2003 | Jenkins | G06F 9/52 700/2 |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0221138 A1 * | 11/2004 | Rosner | G06F 9/3885 712/218 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0183054 A1 * | 8/2005 | Wein | G06F 30/392 716/105 |
| 2006/0010017 A1 * | 1/2006 | Hase | G06Q 10/06 703/7 |
| 2008/0313565 A1 | 12/2008 | Albertson | |
| 2009/0177744 A1 | 7/2009 | Marlow et al. | |
| 2014/0249802 A1 * | 9/2014 | Jackson | G06F 40/211 704/9 |
| 2015/0212663 A1 | 7/2015 | Papale et al. | |
| 2015/0234552 A1 | 8/2015 | Ono | |
| 2016/0006580 A1 * | 1/2016 | Lamb | H04L 12/467 370/254 |
| 2016/0117087 A1 | 4/2016 | Couris et al. | |
| 2017/0236188 A1 * | 8/2017 | Puck | G06Q 30/0635 705/26.81 |

OTHER PUBLICATIONS

Non-Final Office Action for U.S. Appl. No. 16/177,352 dated Apr. 16, 2020, 17 pages.

* cited by examiner

*Algorithm – Automatic Rearrangement of Process Flows*

```
     Input:  Process flows
     Output: Rearranged process flow
1:   AutomaticRearrangement(A)
2:   Mark all elements as:
3:          isVisited = false;
4:   Iterate over all elements to determine immediate parents and children for
5:          each element:
6:          if (element has no children) {
7:                 element = root element
8:          }
9:   Iterate over all root elements:
10:         if (!root.isVisited && !root.isTravesing) {
11:               isTraversing = true;
12:               if (root has children) {
13:                     Iterate over all children: {
14:                           if (!child.isVisited && !child.isTraversing) {
15:                                 rerun modifiedDFS algorithm on the child
16:                           } else {
17:                                 There is a cycle or element has been visited
18:                                 and can be ignored
19:                           }
20:                     }
21:                     Update locationX for the parent node based on the count and
22:                     location of the children
23:               } else {
24:                     Update locationX to startX
25:               }
26:               Set locationY;
27:               Set isVisited to true;
28:               Set isTraversing to false;
29:               if (root does not have any children) {
30:                     increment startX;
31:               } else {
32:                     startX stays unmodified
33:               }
34:         }
35:  }
```

FIG. 4

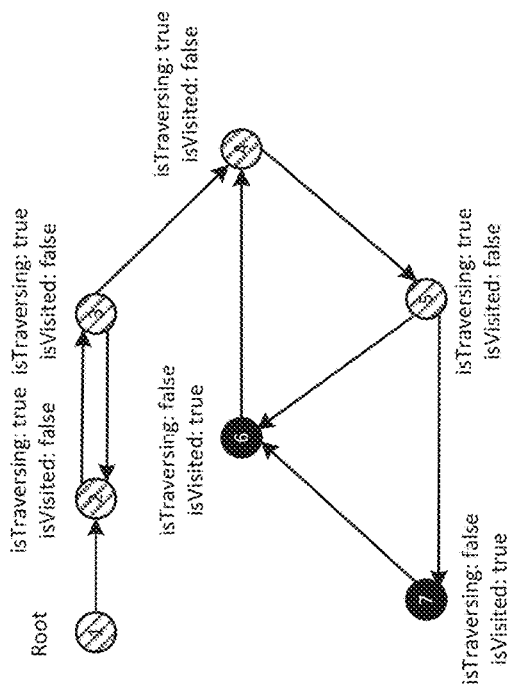
FIG. 8I

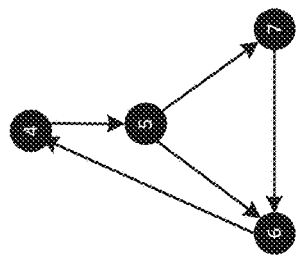
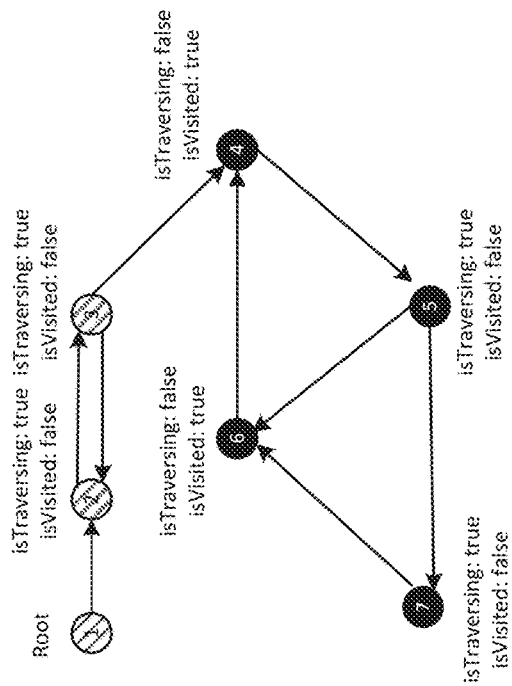
FIG. 8K

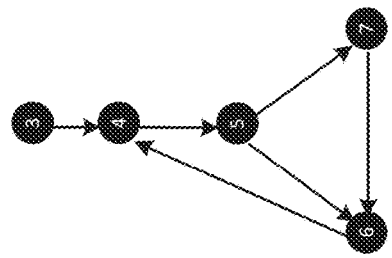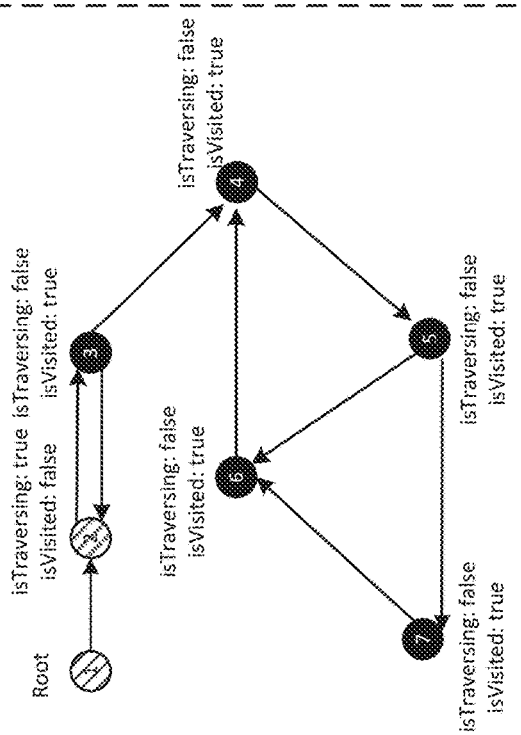
FIG. 8L

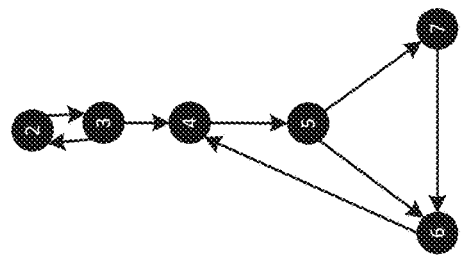
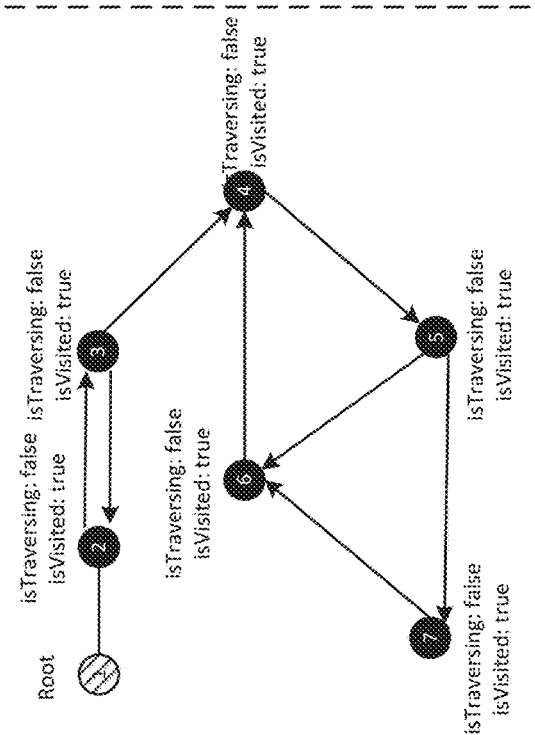
FIG. 8M

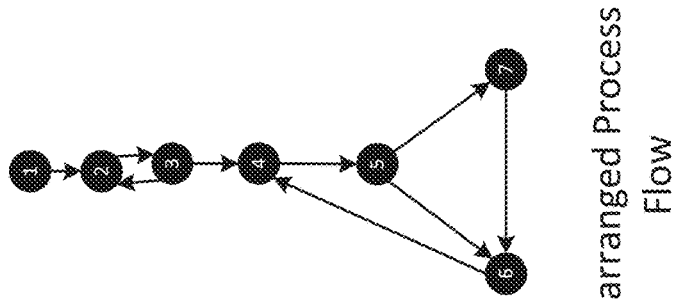
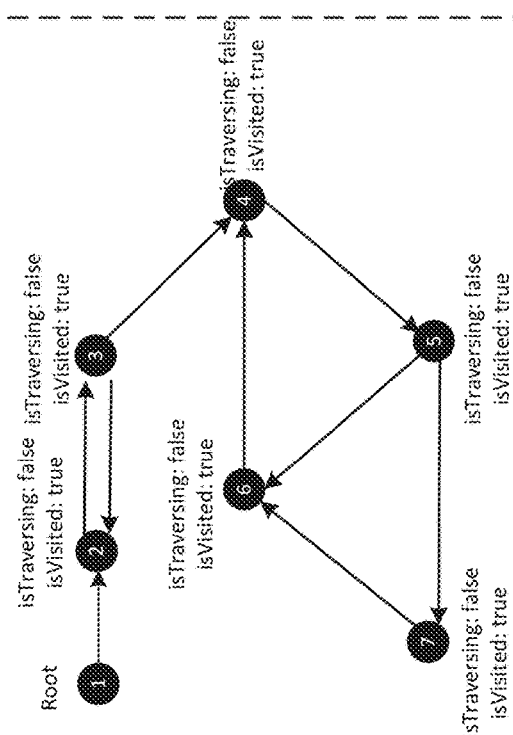
FIG. 8N

AUTOMATIC REARRANGEMENT OF PROCESS FLOWS IN A DATABASE SYSTEM

TECHNICAL FIELD

Embodiments relate to techniques for computer database operations. More particularly, embodiments relate to automatic rearrangement of process flows in a database system.

BACKGROUND

Process flows for a database may be illustrated in a tree structure to enable a user to visualize the various flows through multiple nodes. Each flow may then be seen as, for example, a flow from a particular start point to one or more end points through various branches. In a particular example, a database system may allow for unstructured or freeform entry of process flows into a canvas.

However, in a structure in which there are numerous processes, it is possible that errors and inconsistencies may be introduced into a process flow. Further, process flows may include inefficiencies, such as repetitive process flows that could more efficiently be served with a single combined process flow structure.

While a database system may illustrate the numerous process flows present in a complex system, an illustration will include many flow paths, and it may be extremely difficult for user to detect potential problems in the process flows because of the resulting complexity of the illustration.

BRIEF DESCRIPTION OF THE DRAWINGS

Embodiments are illustrated by way of example, and not by way of limitation, in the figures of the accompanying drawings in which like reference numerals refer to similar elements.

FIG. 4 is an illustration of an algorithm to for automatic rearrangement of process flows according to one or more embodiment;

DETAILED DESCRIPTION

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system or process is to provide automatic rearrangement of process flows in a database system. In some embodiments, the automatic rearrangement is utilized to enable a user to visualize any number of process flows in a complex database system.

In some embodiments, an apparatus, system, or process is to generate a rearranged process flow utilizing a search that is made through each process flow. In some embodiments, the search includes the application of a Depth First Search (DFS), wherein each branch of the process flow is searched through to an end. However, in a system in which there are numerous data flows, a conventional DFS operation may not be capable of processing all process flows.

In some embodiments, an apparatus, system, or process programmatically rearranges any given flow in a top down (or other logical direction) tree structure. The rearrangement of the process flow is to modify the flow alignment and structure, with the resulting flow being much simpler to work with or to debug. Auto-rearranging the flow further allows a user to input a process flow in a freeform or unstructured style, without any requirement for ensuring all the nodes of the process flow are being placed at the right grid and are aligned, etc. (As used herein, the component elements of a process flow may interchangeably be referred to as nodes, elements, modules, or other similar terminology.)

In some embodiments, an apparatus, system, or process further includes the capability of limiting the movement of process flow nodes to a given grid. This limitation assists a user in maintaining the right structure and alignment post auto-rearranging, thereby further improving the visualization of the multiple process flows in a complex system.

Figure 1:
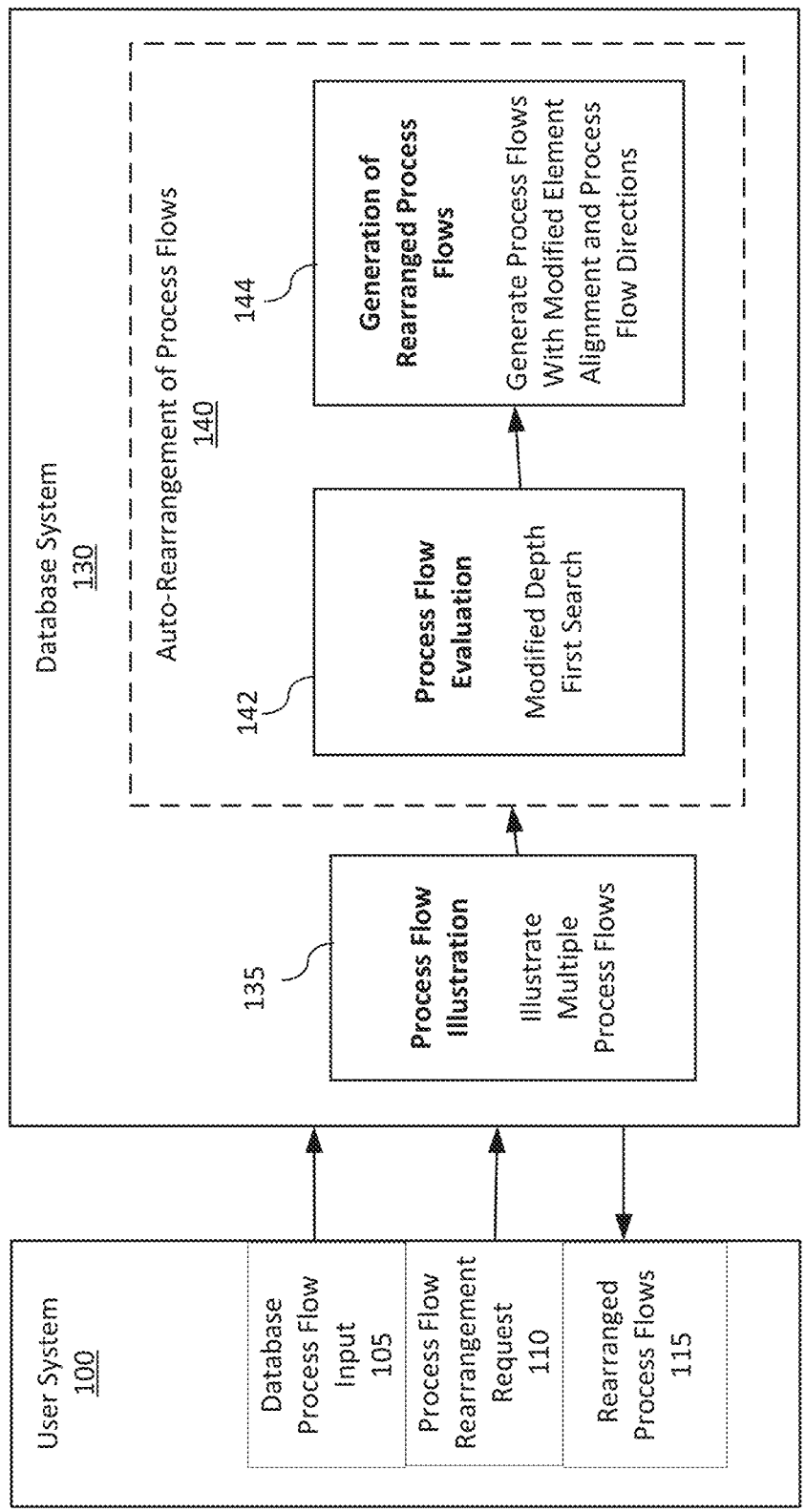
FIG. 1 is an illustration of automatic rearrangement of process flows in an apparatus or system according to one or more embodiments.

FIG. 1 is an illustration of automatic rearrangement of process flows in an apparatus or system according to one or more embodiments. A user via a user system 100, such as a user system 912 illustrated in FIGS. 9 and 10, may provide database process flow input 105 to a database system 130, such as system 916 illustrated in FIGS. 9 and 10. The database system 130 includes a process flow illustration subsystem or service 135, which may allow the entry of process flows by a user in, for example, an unstructured or freeform style, without being limited to particular node location or flow direction. This entry allows for ease of use by the user but may result in a very complicated structure as the process flows in a system become more complex.

In some embodiments, the database system 130 further includes an automatic rearrangement of the entered process flows subsystem or service 140. In some embodiments, upon receipt of a command, such as process flow rearrangement request 110 from a user, the entered process flows are provided for process flow evaluation 142, wherein the evaluation may include a modified depth first search (DFS). In some embodiments, rearrangement request 110 may be a simple command without requiring specification of the rearrangement to be made of the existing process flows. The process flow evaluation 142 may include a process as illustrated in one or both of FIGS. 3 and 4. In some embodiments, based on the process flow evaluation 142, the auto-rearrangement of process flows 140 further provides for generation of modified process flows 144, including generation of process flows with modified node alignment and process flow directions without changing the actual flows within the process flow. Rearranged process flows 115 may then be provided for evaluation and correction by the user at the user system 100.

Figure 2:
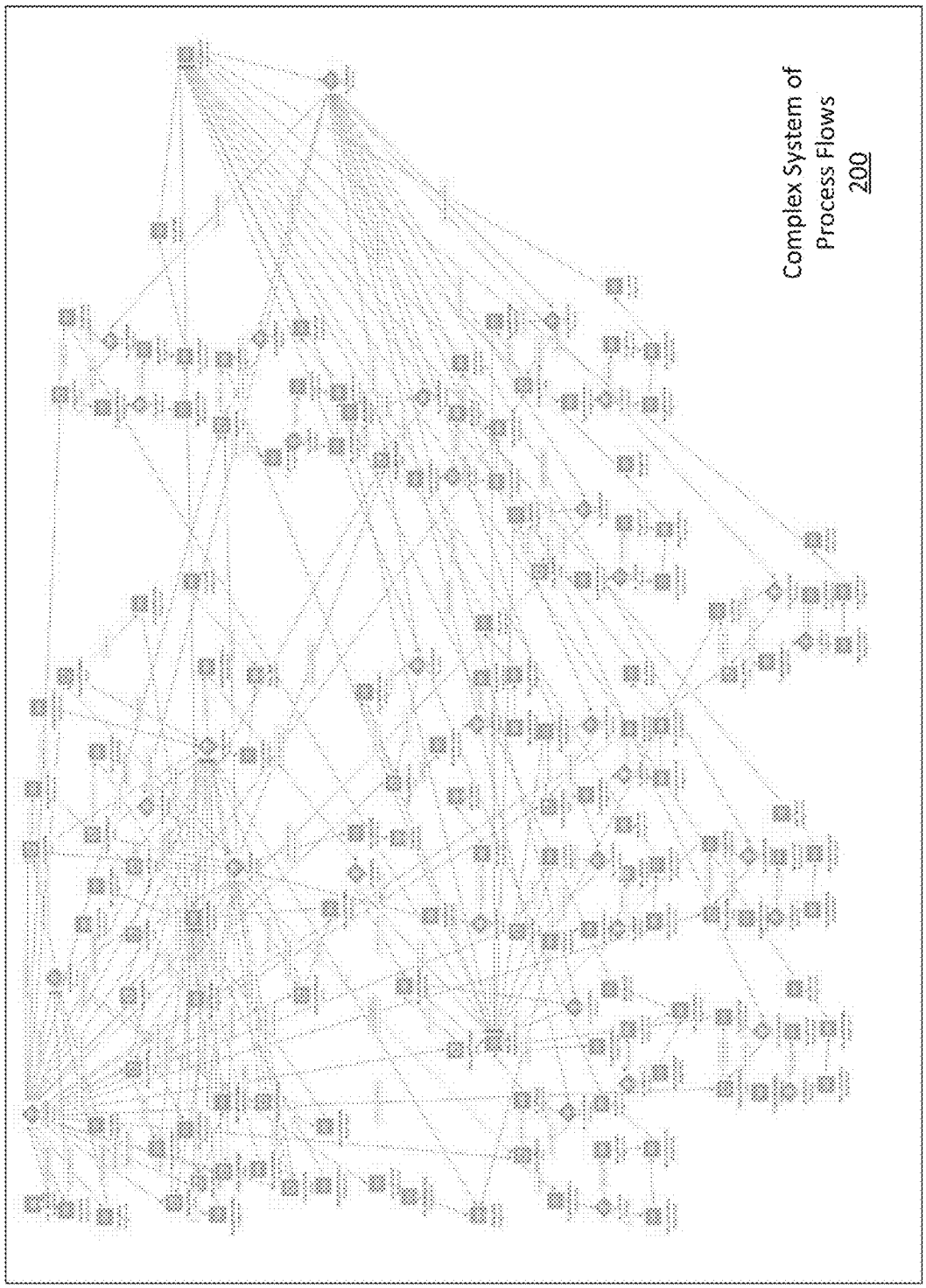
FIG. 2 is an illustration of a portion of a complex process flow prior to rearrangement utilizing an embodiment.

FIG. 2 is an illustration of a portion of a complex process flow prior to rearrangement utilizing an embodiment. As shown in FIG. 2, a complex system of process flows 200 will include a large number of process flows, wherein the original process flows may be entered in a freeform or unstructured format. As can be seen in FIG. 2, once a system becomes moderately complex it is extremely difficult for a user to analyze and correct the process flows in the system.

Figure 3:
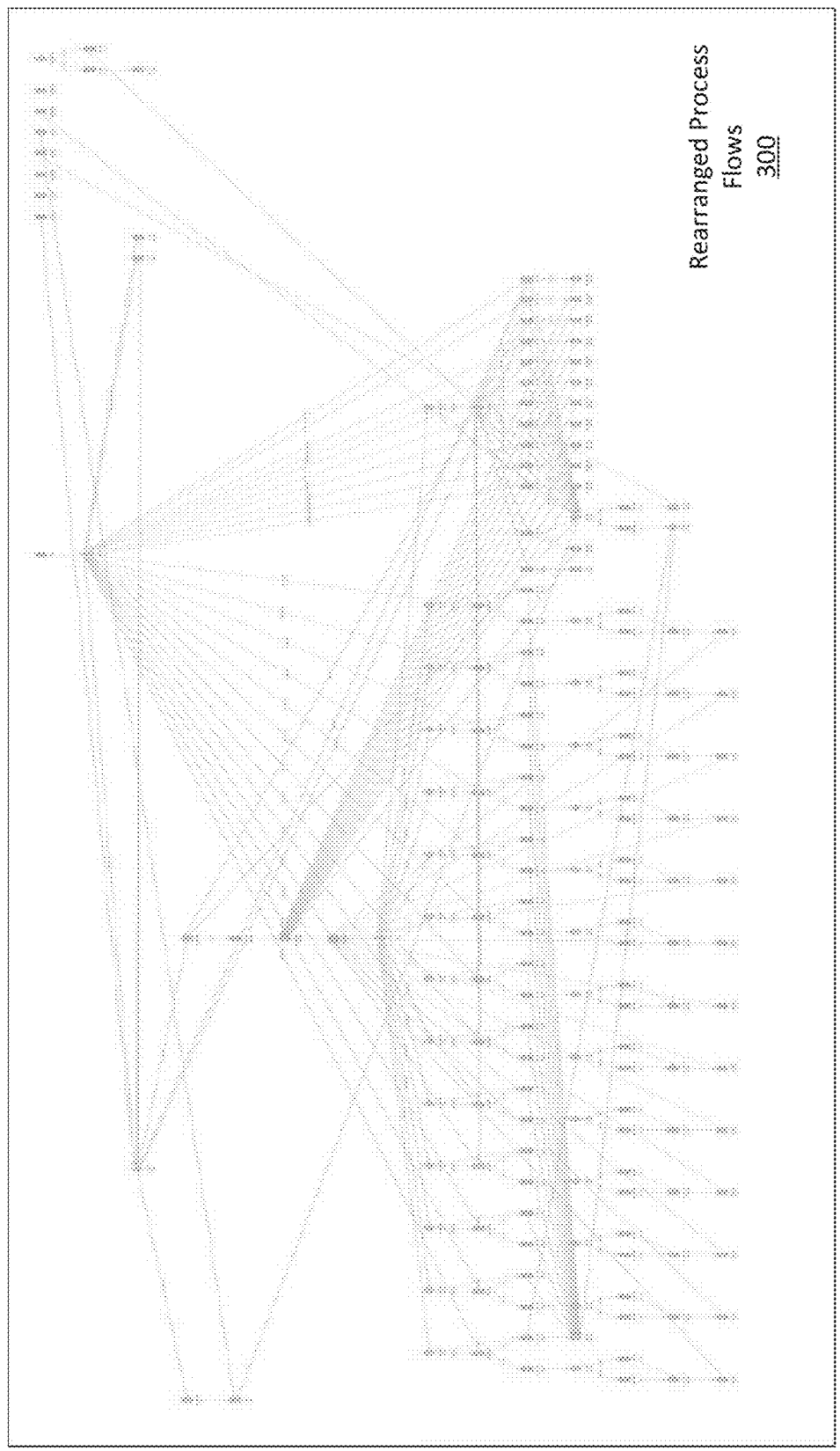
FIG. 3 is an illustration of a portion of a complex system of process flows following performance of automatic rearrangement according to one or more embodiments.

FIG. 3 is an illustration of a portion of a complex system of process flows following performance of automatic rearrangement according to one or more embodiments. As shown in FIG. 3, following rearrangement of process flows, such as provided by the auto-rearrangement of process flows subsystem or service 140 illustrated in FIG. 1, a rearranged system 300 will still include many process flows, but the process flows will include nodes that have been realigned in a set grid, with process flows now proceeding in set directions. In this particular illustration, the start (root) nodes are to be aligned at the top of each process flow, with process flows to continue downward towards one or more end (leaf) nodes. Subsequent to the performance of automatic rearrangement of process flows by an apparatus, system, or process, a user can now effectively zoom into individual subtrees, and work much more efficiently to modify or correct the process flows. However, the individual process flows are not substantively altered, but rather provide the same flow characteristics as provided in the unprocessed system.

FIG. 4 is an illustration of an algorithm to for automatic rearrangement of process flows according to one or more embodiment. The algorithm is be applied to a system including any number of process flows, and in particular a complex system in a database, the system including a large number of process flows. In some embodiments, the algorithm implements a modified version of Depth First Search (DFS) to rearrange the nodes into a logical and organized arrangement on the canvas (screen). The process beings with determination of the immediate parents and children of each node in a process flow. Utilizing this information, the algorithm operates to determine all of the root nodes (or root elements) for each process flow.

Based on the determined root nodes, the algorithm proceeds down (away from the root) to the leaves of each root, and then proceeds bottom-up (from the leaves to the roots), placing nodes at the particular levels and at x-y coordinates in order to align the nodes properly. The levels for the nodes are dependent upon each node's respective parent and child nodes. Each node's x-y coordinate is then established based on the number of nodes for each process flow at each level, such as at an average point for the positions of each child of the node. After recursively positioning all the nodes on the canvas, the algorithm then completes the generation of tree structures for the process flows in the complex system.

A challenging component in the rearrangement of process flows is addressing the cyclic dependency (also referred to circular dependency) case in which two or more nodes directly or indirectly depend on each other. In some embodiments, automatic rearrangement of a process flow including one or more cyclic dependencies is provided by structuring the algorithm to keep track of the parent(s) that are currently being traversed. Each time the process starts proceeding down a parent's subtree, the isTraversing property for the parent node is set to be true. Once the entire subtree has been visited, the isTraversing property is set to be false. This portion of the algorithm assists in identifying any cycles in a process flow, i.e. whenever the process comes across a child that has an isTraversing property set to true, this indicates that the child node is a cycle. The algorithm can then move on to the next child without re-calculating the previously traversed element's level or position.

Figure 5A:
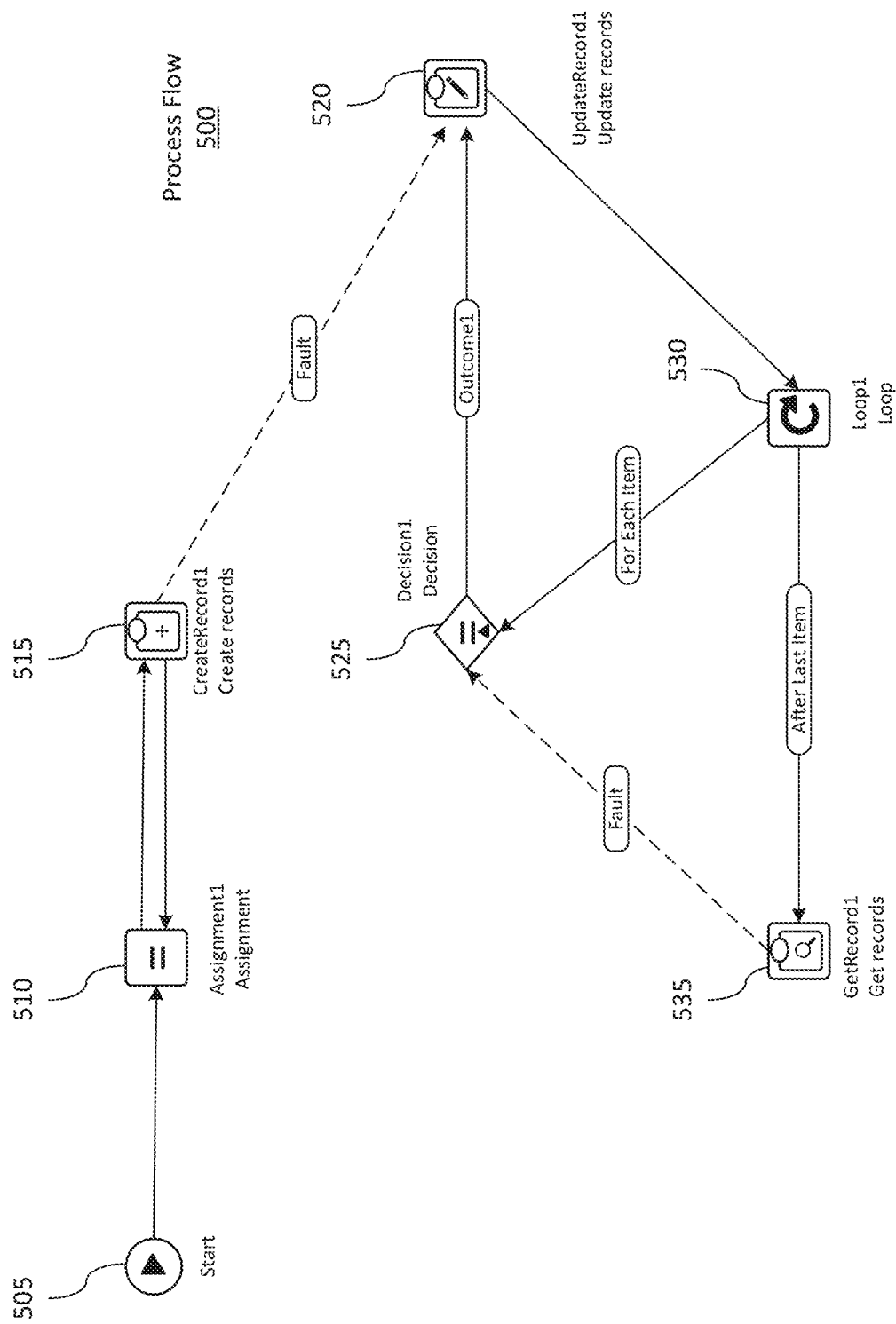
FIGS. 5A and 5B are illustrations of a first exemplary process flow that is subjected to automatic rearrangement in an apparatus, system, or process according to one or more embodiments.
Figure 5B:
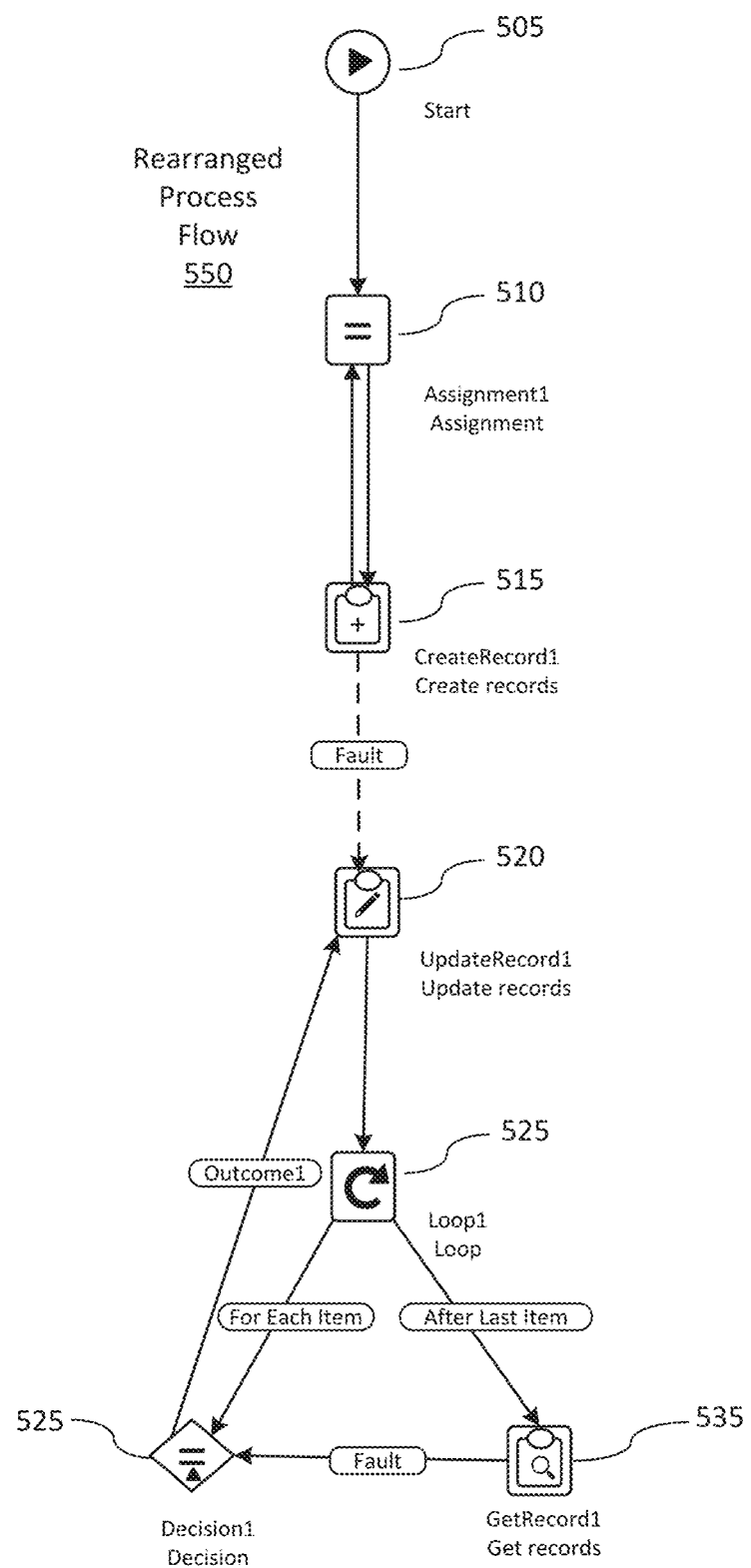

FIGS. 5A and 5B are illustrations of a first exemplary process flow that is subjected to automatic rearrangement in an apparatus, system, or process according to one or more embodiments. As shown in FIG. 5A, a process flow 500 proceeds from a Start node 505 to Assignment1 510, with process continuing to and from CreateRecord1 515 (in a cycle), with a fault causing the process to proceed to UpdateRecord 1 520 and to Loop1 530, which is then follows to Decision1 525 for each item or GetRecord1 535 after a last item.

In some embodiments, the automatic rearrangement of process flow 500, such as utilizing the algorithm illustrated in FIG. 4, will generate rearranged process flow 550 as shown in FIG. 5B, which is now presented in a logical top-down arrangement wherein start 505 is a root node (placed on a first level in the top-down tree structure), with the process flowing down to Assignment1 510 (second level), CreateRecord1 515 (third level), UpdateRecord1 520 (fourth level), Loop1 525 (fifth level), and then following to nodes Decision1 530 (for each item) and GetRecord1 535 (after the last item) (sixth level), where the process from Decision1 returns to UpdateRecord1 520.

Figure 8A:
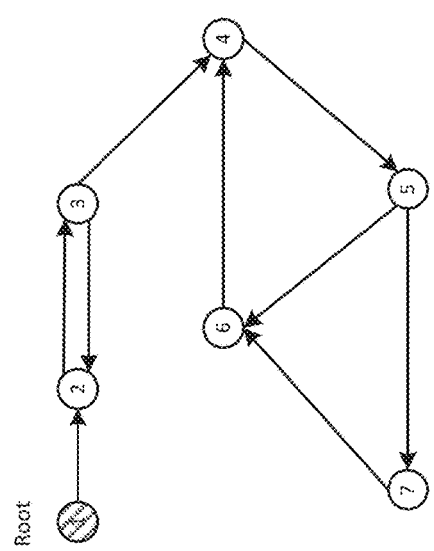
FIGS. 8A-8N are illustrations of the first exemplary process flow of FIGS. 5A and 5B that is subjected to automatic rearrangement in an apparatus, system, or process according to one or more embodiments.

Details of the automatic rearrangement of the process flow 500 to generate the rearranged process flow 550 are illustrated in FIGS. 8A through 8N.

Figure 6A:
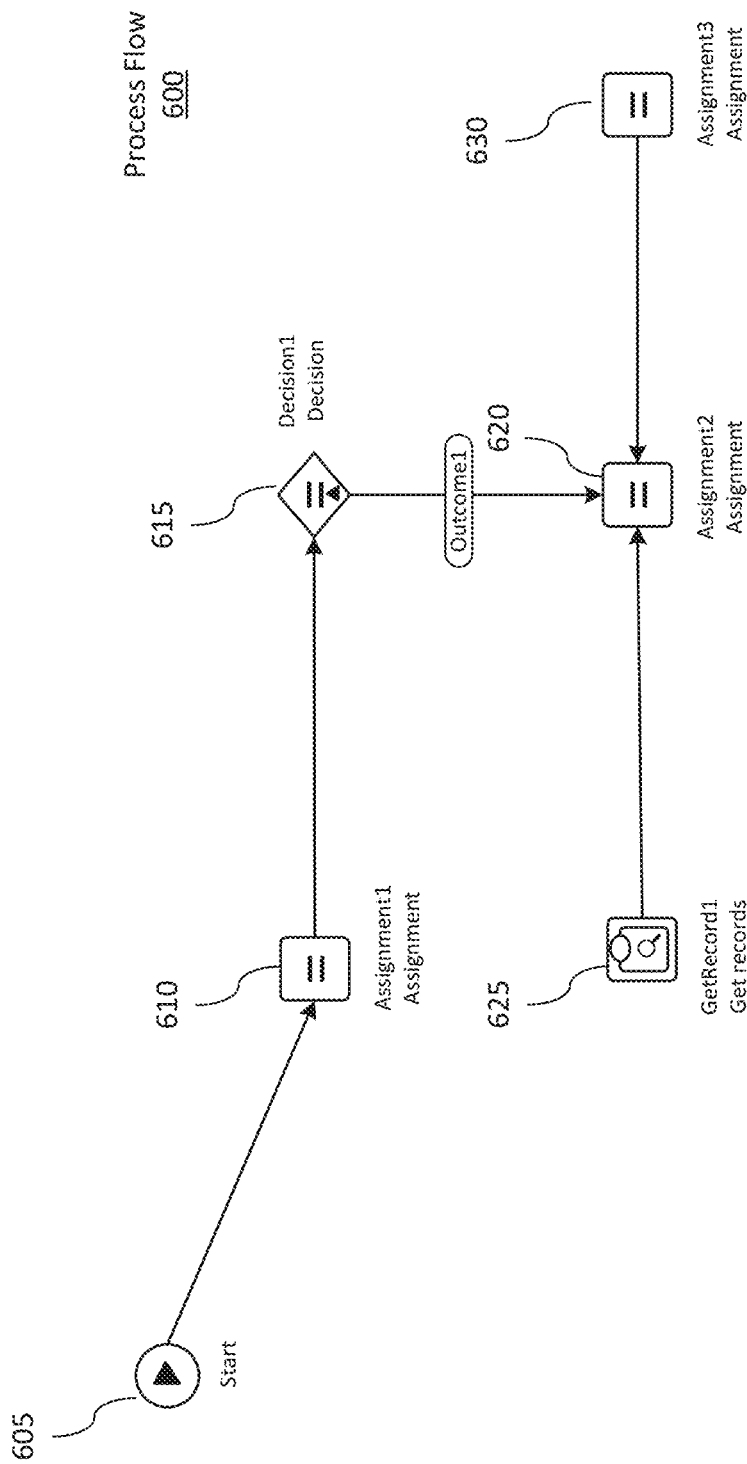
FIGS. 6A and 6B are illustrations of a second exemplary process flow that is subjected to automatic rearrangement in an apparatus, system, or process according to one or more embodiments.
Figure 6B:
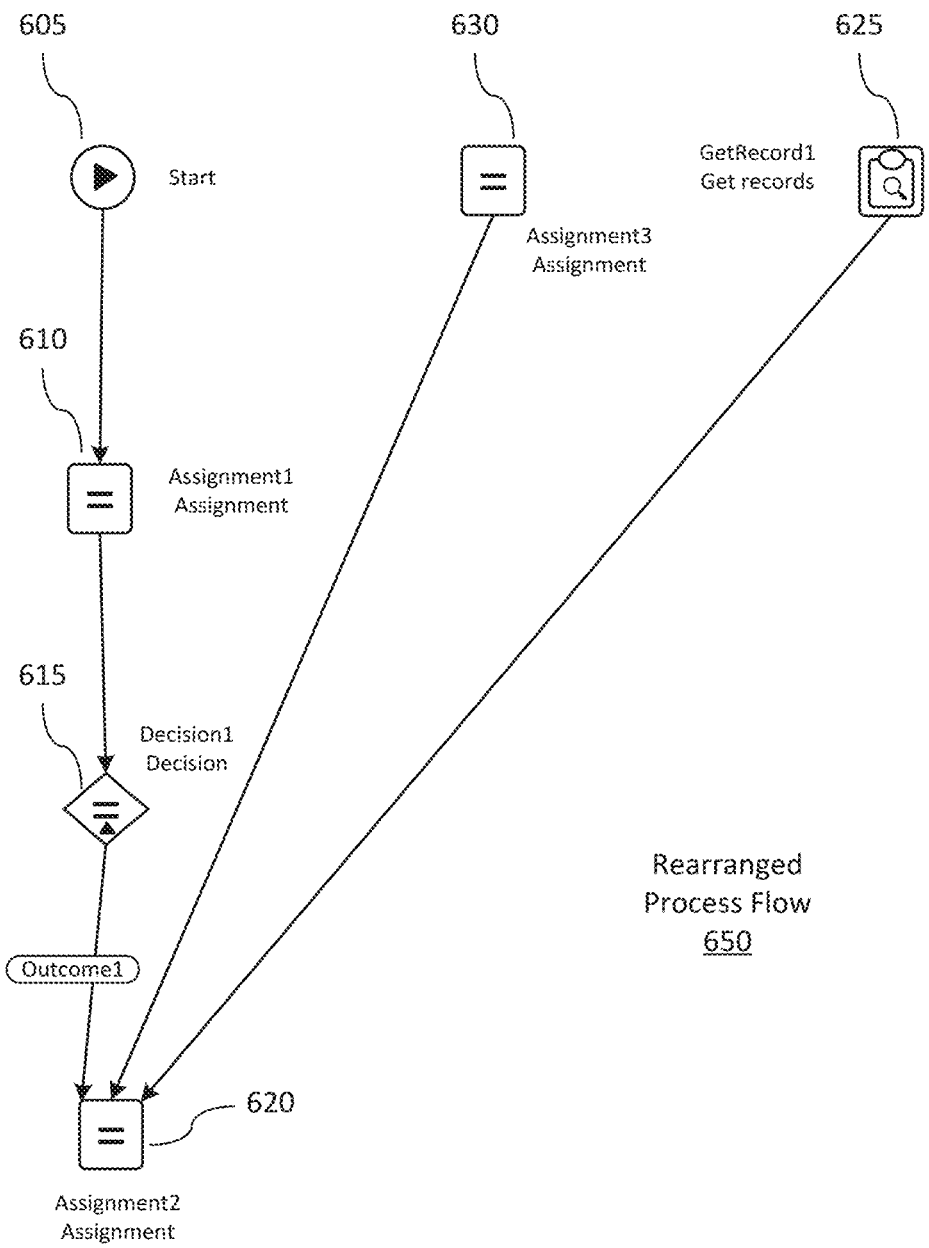

FIGS. 6A and 6B are illustrations of a second exemplary process flow that is subjected to automatic rearrangement in an apparatus, system, or process according to one or more embodiments. As shown in FIG. 6A, a process proceeds from a Start node 605 to Assignment1 610, and Decision1 615. The process continues with Outcome1 being directed to Assignment2 620, which further receives input from nodes getRecord1 625 and Assignment3 630.

In some embodiments, the automatic rearrangement of process flow 600 will generate rearranged process flow 650 as shown in FIG. 6B, which is now provided in a logical top-down arrangement wherein Start 605, Assignment3 630, and getRecord1 625 are parent nodes (on a first level in the top-down tree structure), with the process flowing from Start 605 down to Assignment1 610 (second level), Decision1 615 (third level), and then to Assignment 620 (fourth level), which also receives process flows from Assignment3 630 and getRecord1 625.

Figure 7A:
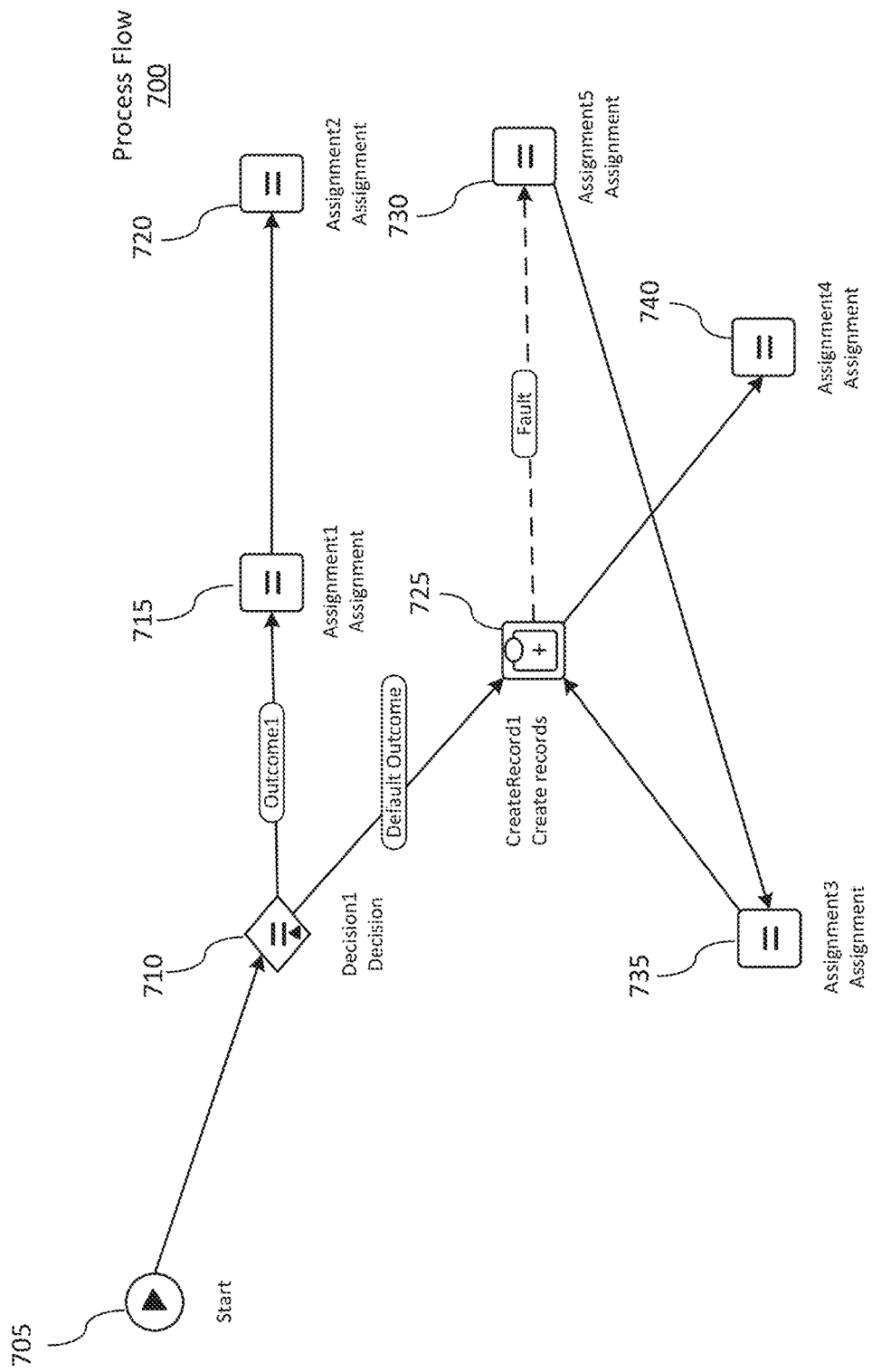
FIGS. 7A and 7B are illustrations of a third exemplary process flow that is subjected to automatic rearrangement in an apparatus, system, or process according to one or more embodiments.
Figure 7B:
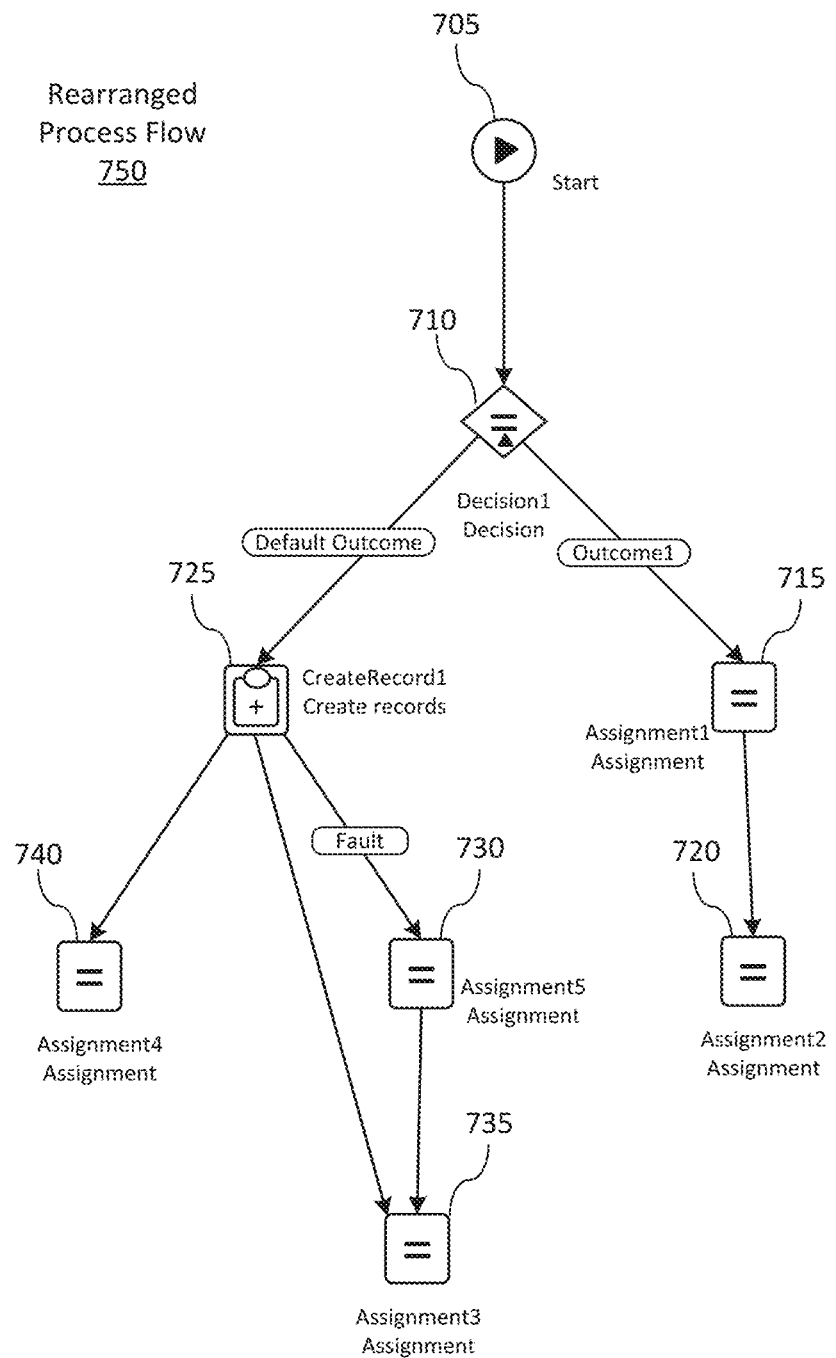

FIGS. 7A and 7B are illustrations of a third exemplary process flow that is subjected to automatic rearrangement in an apparatus, system, or process according to one or more embodiments. As shown in FIG. 7A, a process flow 700 proceeds from a Start node 705 to a Decision1 710, with Outcome1 proceeding to Assignment1 715 and then to Assignment2 720, and with a Default Outcome proceeding to createRecord1 725. From createRecord1 725, the process flow continues to Assignment 4 740, or on a fault to Assignment5 730, and then to Assignment3 735 and back to CreateRecord1 725.

In some embodiments, the automatic rearrangement of process flow 700 will generate rearranged process flow 750 as shown in FIG. 7B, which is now provided in a logical top-down arrangement wherein start 705 is a first parent node (on a first level in the top-down tree structure), with the process flowing down to a Decision1 710 (second level), with Outcome1 proceeding to Assignment1 715 (second level) and then to Assignment2 720 (third level). Further, on a Default Outcome the process flow continues to createRecord1 725 (third level). From createRecord1 725, the process flow continues to Assignment 4 740 (fourth level), or on a fault to Assignment5 730 (fourth level), and then to Assignment3 735 (fifth level) and back to CreateRecord1 725.

FIGS. 8A-8N are illustrations of the first exemplary process flow of FIGS. 5A and 5B that is subjected to automatic rearrangement in an apparatus, system, or process according to one or more embodiments. In an embodiment of a process as described above, all nodes are marked as being unvisited, isVisited: false. Further, each node in the plurality of process flows is evaluated to identify all root nodes. A particular process is illustrated in FIG. 8A-8N as Nodes 1 through 7, the process flow being the same process flow as illustrated in FIGS. 5A and 5B. Following such initial processing, FIGS. 8A through 8N provide a detailed illustration of the automatic rearrangement of the process flow, with each figure providing an element of the process as follows:

FIG. 8A: Process begins with the identified root node for the process flow, Node 1. For illustration, each node that is traversed is marked with cross hatching, as with Node 1 in FIG. 8A.

Figure 8B:
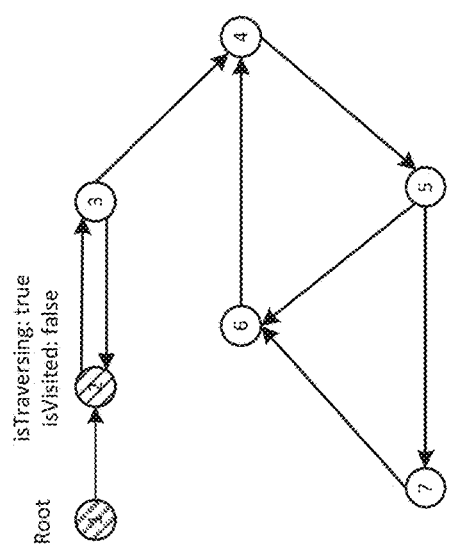

FIG. 8B: Proceed from Node 1 to evaluate a following child node, Node 2, with isTraversing being set to true, and isVisited being false.

Figure 8C:
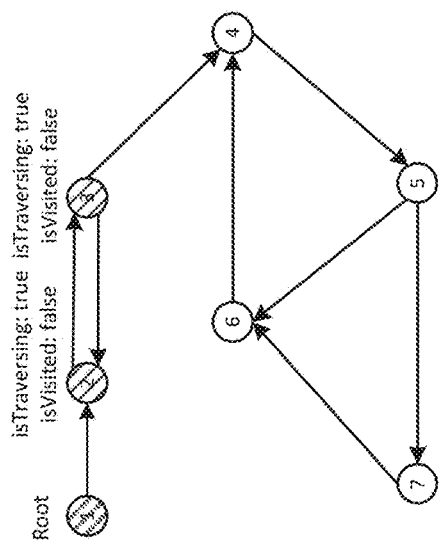

FIG. 8C: Proceed from Node 2 to evaluate a next succeeding child node, Node 3, with isTraversing being set to true, and isVisited being false.

Figure 8D:
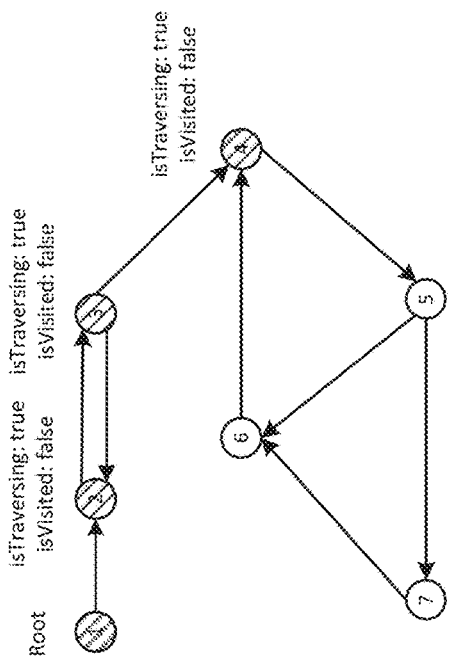

FIG. 8D: Proceed from node 3 to evaluate a next succeeding child node, Node 4, with isTraversing being set to true, and isVisited being false.

Figure 8E:
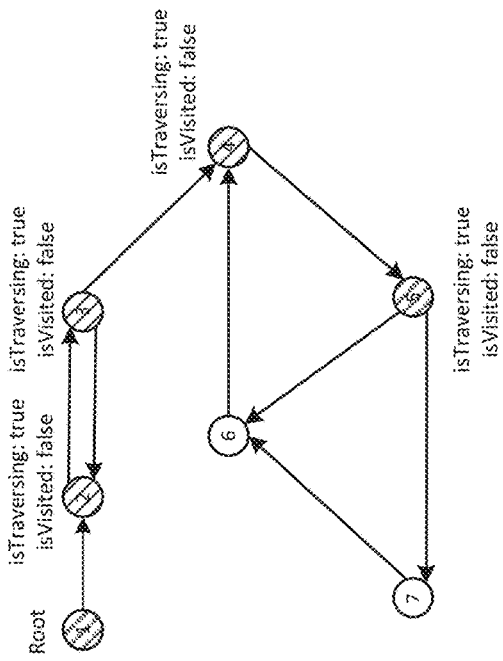

FIG. 8E: Proceed from Node 4 to a next succeeding child node, Node 5, with isTraversing being set to true, and isVisited being false.

Figure 8F:
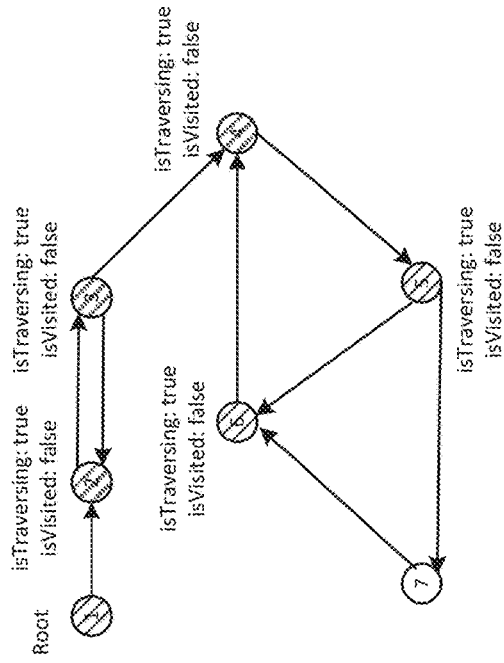

FIG. 8F: Proceed from Node 5 to a next succeeding child node, Node 6, with isTraversing being set to true, and isVisited being false. In this case, there are two child nodes, Node 6 and Node 7.

Figure 8G:
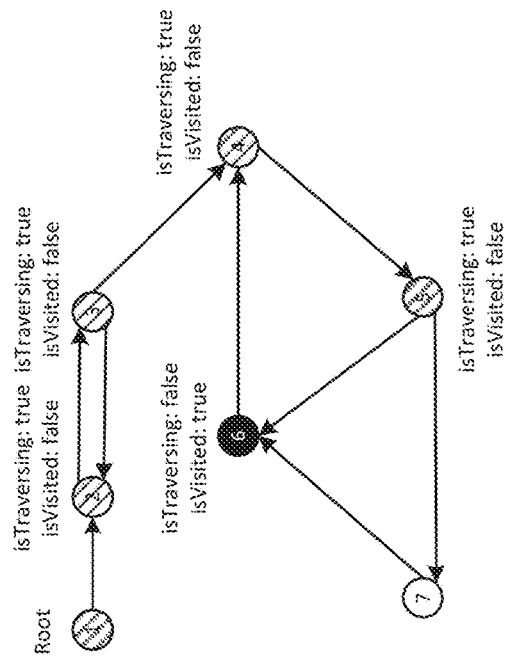

FIG. 8G: Proceed from Node 6 to evaluate a next node, Node 4. However, Node 4, has been visited, isVisited being true, thus indicating a cyclic dependency or the element has been visited and thus can be ignored. The status of isTraversing is set to false. The sub-branch has been completed, indicated by node with a block background, and a level and location for Node 6 can be established.

Figure 8H:
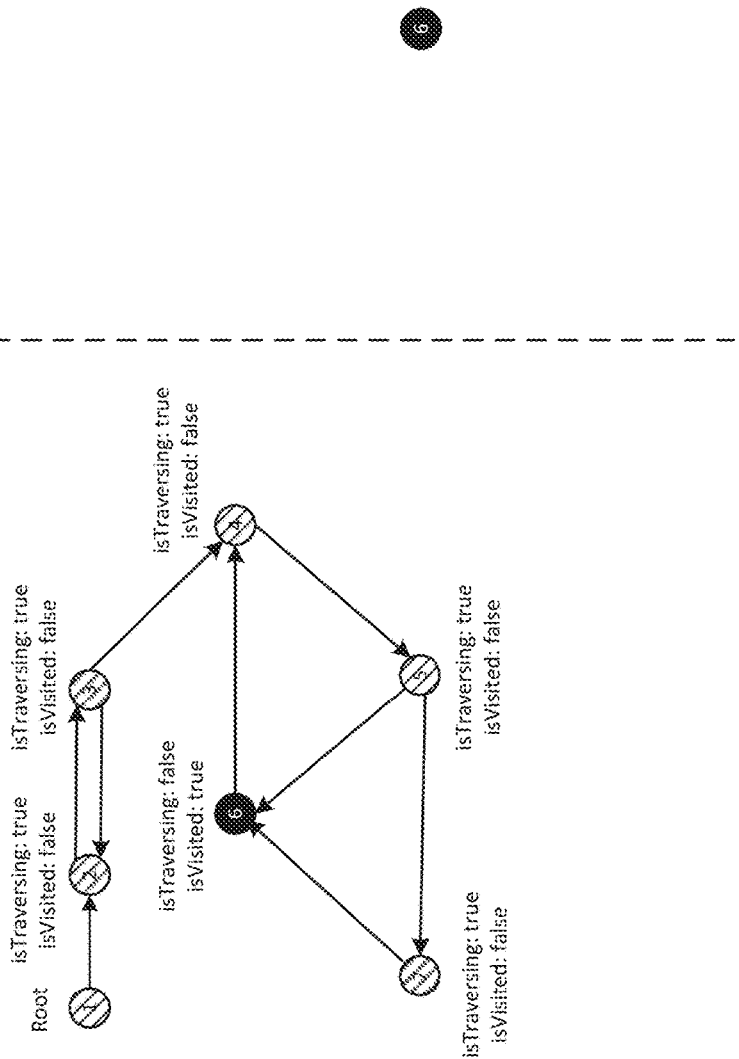

FIG. 8H: Proceed from Node 5 to a next succeeding child node, Node 7, with isTraversing being set to true, and isVisited being false.

FIG. 8I: Proceed from Node 7 to evaluate a next node, Node 6. Node 4 has been visited, isVisited being true, thus indicating a cyclic dependency or the element has been visited and thus can be ignored. The status of isTraversing is set to false. The sub-branch has been completed, and a level and location for Node 7 can be established, the level of Node 7 being the same as Node 6 based on the parent node for both, Node 5.

Figure 8J:
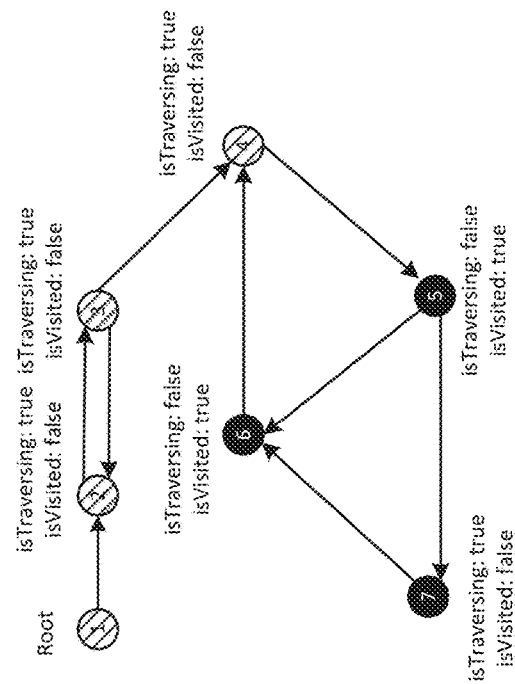

FIG. 8J: The nodes of the process flow have been traversed, and the process proceeds up from the leaf nodes. Up from Nodes 6 and 7 is Node 5, and a level (above Nodes 6 and 7) and location for Node 5 is established. The direction of the flow between Nodes 6 and 7 is across the level of the nodes.

FIG. 8J: The nodes of the process flow have been traversed, and the process proceeds up from the leaf nodes. Up from Nodes 6 and 7 is Node 5, and a level (above Nodes 6 and 7) and location for Node 5 is established. Further, the direction of the flows between Node 5 and one or more lower nodes (Nodes 6 and 7) is established.

FIG. 8K: Up from Node 5 is Node 4. A level (above Node 5) and location for Node 4 is established, and the direction of the flows between Node 4 and one or more lower nodes is established.

FIG. 8L: Up from Node 4 is Node 3. A level (above Node 4) and location for Node 3 is established, and the direction of the flows between Node 3 and one or more lower nodes is established.

FIG. 8M: Up from Node 3 is Node 2. A level (above Node 3) and location for Node 2 is established, and the direction of the flows between Node 2 and one or more lower nodes is established.

FIG. 8N: Up from Node 2 is Node 1, the root node. A level (above Node 2) and location for Node 1 is established, and the direction of the flows between Node 1 and one or more lower nodes is established. At this point, all nodes and flows of the process flow have been rearranged automatically, including addressing the cyclic dependency present in the nodes. The processing is performed without requiring any description of the process flow from the user.

It is noted that the particular processes illustrated in FIGS. 8A-8N relate to a certain example of a process flow, and any other process flow will require processes that traverse the particular nodes and flows present in the process flow.

The examples illustrating the use of technology disclosed herein should not be taken as limiting or preferred. This example sufficiently illustrates the technology disclosed without being overly complicated. It is not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, an apparatus includes a processor to process data for database operation; and a memory to store data for the database, wherein the apparatus is to perform automatic rearrangement of process flows in a database system.

In some embodiments, a non-transitory computer-readable storage medium having stored thereon data representing sequences of instructions that, when executed by a processor, cause the processor to perform operations comprising: performing automatic rearrangement of process flows in a database system.

In some embodiments, a method includes performing automatic rearrangement of process flows in a database system.

In some embodiments, a system includes: data storage for database operations, wherein the system is to perform automatic rearrangement of process flows in a database system.

Figure 9:
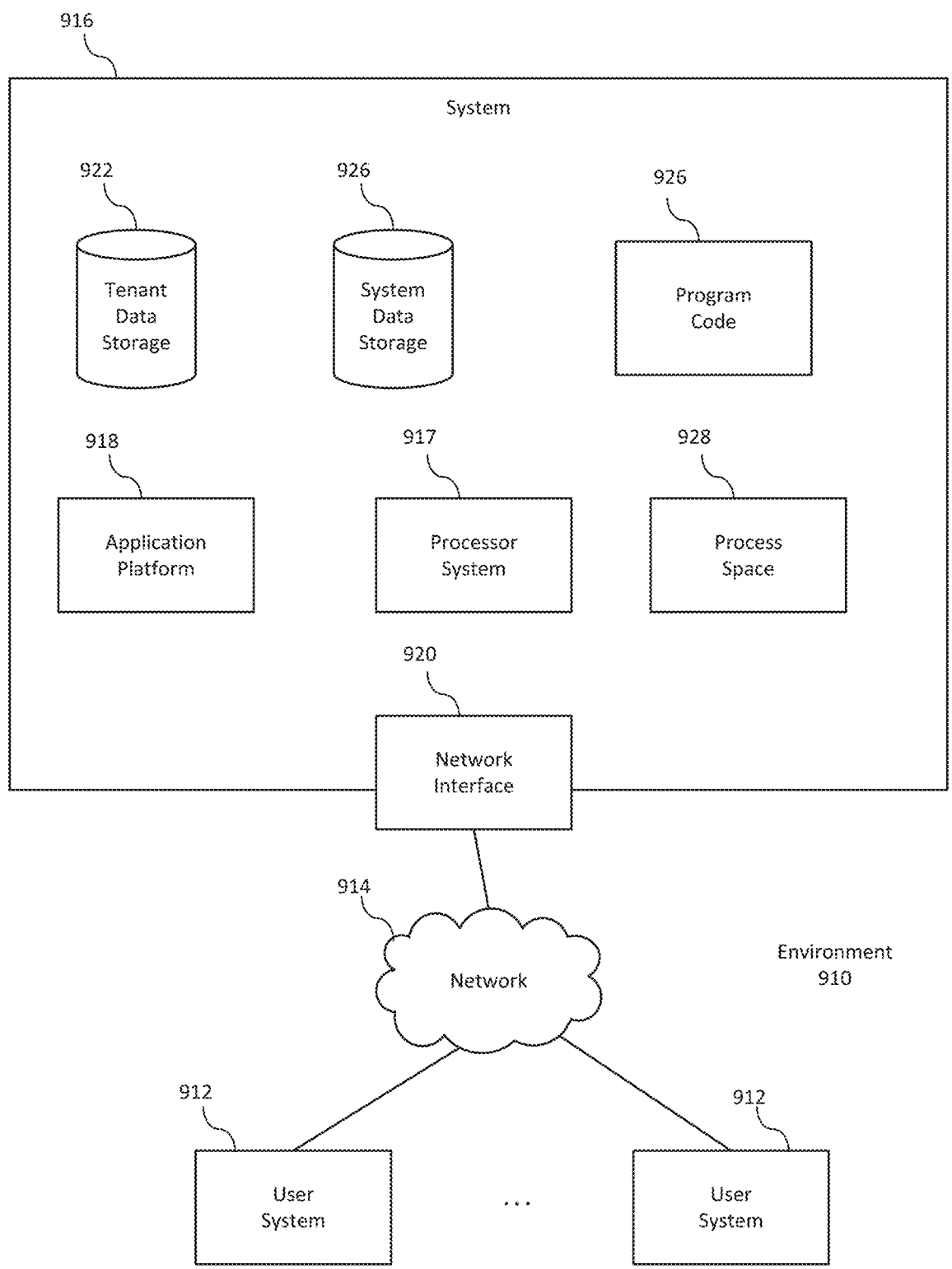
FIG. 9 illustrates a block diagram of an environment in which an on-demand database service may be provided.

FIG. 9 illustrates a block diagram of an environment in which an on-demand database service may be provided. In some embodiments, the environment 910 includes automatic rearrangement of process flows, such as illustrated in FIGS. 1-8N. The environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a smart phone, a laptop or tablet computer, a work station, and/or a network of computing devices. As illustrated in herein FIG. 9 and in more detail in FIG. 10, user systems 912 may interact via a network 914 with an on-demand database service, such as system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" may be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third-party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third-party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop or tablet computer, smart phone, or any wireless access protocol (WAP) enabled device or any other computing device capable of interfacing directly or indirectly to the Internet or other network connection. User system 912 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
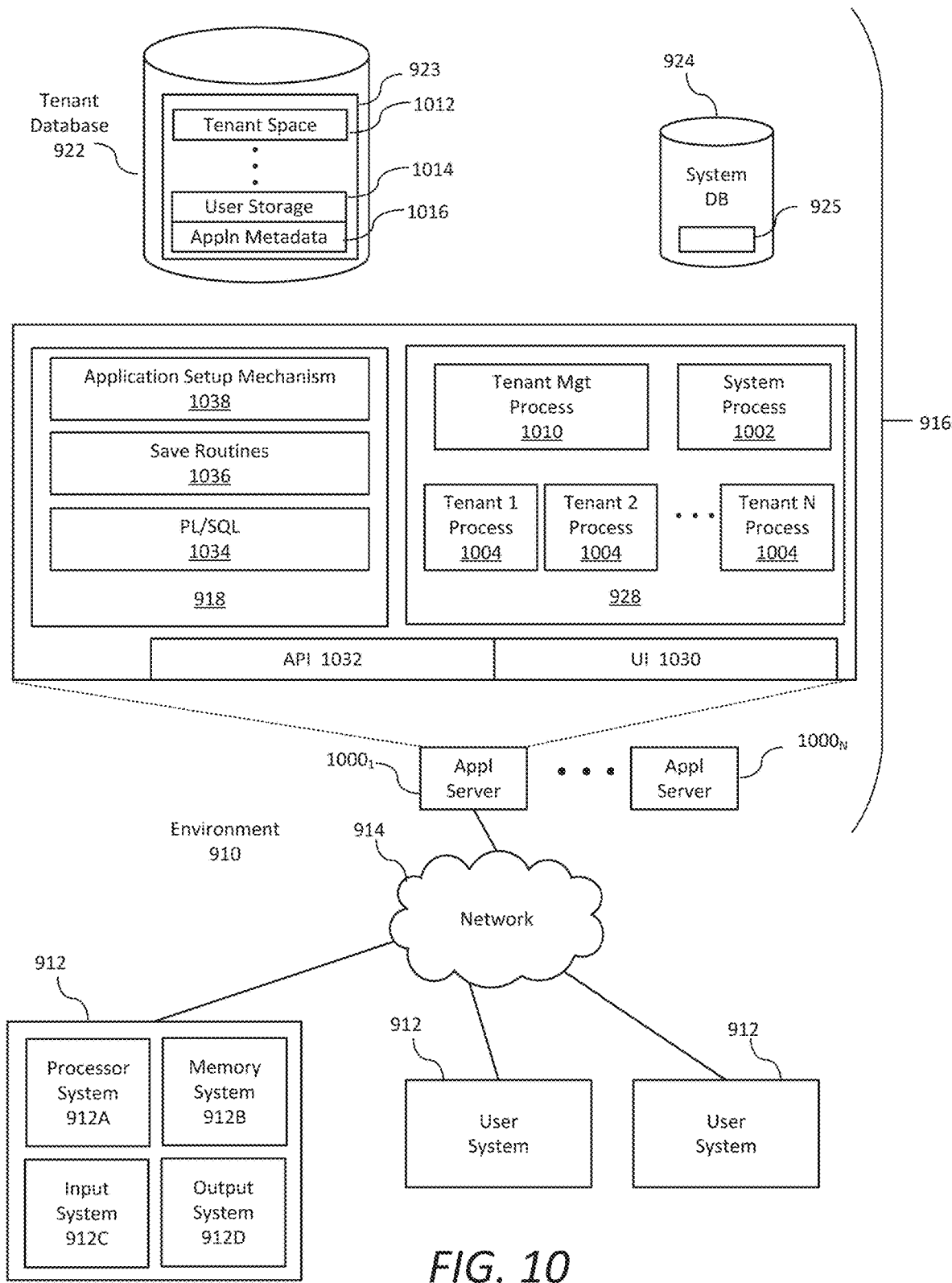
FIG. 10 illustrates further details of an environment in which an on-demand database service may be provided.

FIG. 10 illustrates further details of an environment in which an on-demand database service may be provided. FIG. 10 provides further detail regarding elements of system 916. In addition, various interconnections in an embodiment are provided. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long-term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described, but can be practiced with modification and alteration within the spirit and scope of the appended claims. The description is thus to be regarded as illustrative instead of limiting.

What is claimed is:

1. An apparatus comprising:
one or more processors to process data for database operation; and
a database storage;
wherein the apparatus is configurable to cause:
receiving one or more process flows, wherein each process flow includes a plurality of nodes, one or more flows, and a flow between each of the plurality of nodes and at least one other node of the plurality of nodes;
receiving a request to update a first process flow; and
automatically rearranging the first process flow by:
evaluating the first process flow including traversing of each node of the first process flow,
establishing a level and coordinate position for each node of the first process flow,
establishing a logical direction for each flow between the plurality of nodes of the first process flow, wherein the logical direction of a flow represents a direction that the process flow proceeds from a first node to a second node of the plurality of nodes, and
generating a rearranged process flow based on the level and coordinate position for each node and the logical direction for each flow between the plurality of nodes of the first process flow.

2. The apparatus of claim 1, wherein evaluating the first process flow further includes applying a modified depth first search (DFS).

3. The apparatus of claim 2, wherein applying the modified DFS includes maintaining a traversing property indicating whether a subtree of the first process flow is currently being traversed.

4. The apparatus of claim 3, wherein applying the modified DFS includes ending traversal of the subtree upon encountering a child node with the traversing property being true.

5. The apparatus of claim 1, wherein rearranging the first process flow includes automatically processing one or more cyclic dependencies in the first processing flow.

6. The apparatus of claim 1, wherein the one or more process flows are received in an unstructured format.

7. The apparatus of claim 1, wherein the rearranged process flow is a logical top-down process flow tree having a root node at a top level and continuing down through one or more sub-trees.

8. The apparatus of claim 1, wherein generating the rearranged process flow includes limiting movement of the nodes of the process flow after completion of the generation of the rearranged process flow.

9. A non-transitory computer-readable storage medium having stored thereon data representing sequences of instructions that, when executed by a processor, cause the processor to perform operations comprising:
receiving one or more process flows, wherein each process flow includes a plurality of nodes, one or more flows, and a flow between each of the plurality of nodes and at least one other node of the plurality of nodes;
receiving a request to update a first process flow; and
automatically rearranging the first process flow by:
evaluating the first process flow including traversing of each node of the first process flow,
establishing a level and coordinate position for each node of the first process flow,
establishing a logical direction for each flow between the plurality of nodes of the first process flow, wherein the logical direction of a flow represents a direction that the process flow proceeds from a first node to a second node of the plurality of nodes, and
generating a rearranged process flow based on the level and coordinate position for each node and the logical direction for each flow between the plurality of nodes of the first process flow.

10. The medium of claim 9, wherein evaluating the first process flow further includes applying a modified depth first search (DFS).

11. The medium of claim 10, wherein applying the modified DFS includes maintaining a traversing property indicating whether a subtree of the first process flow is currently being traversed.

12. The medium of claim 11, wherein applying the modified DFS includes ending traversal of the subtree upon encountering a child node with the traversing property being true.

13. The medium of claim 9, wherein rearranging the first process flow includes automatically processing one or more cyclic dependencies in the first processing flow.

14. The medium of claim 9, wherein receiving the one or more process flows includes receiving the one or more process flows in an unstructured format.

15. The medium of claim 9, wherein generating the rearranged process flow includes generating a logical top-down process flow tree having a root node at a top level and continuing down through one or more sub-trees.

16. The medium of claim 9, wherein the request does not include description of the first process flow.

17. A system comprising:
 data storage for system data and tenant data;
 a processor system to process data for streaming to one or more organizations; and
 a network interface to provide connection with one or more user systems; and
 wherein the system is configurable to cause:
  receiving one or more process flows from a user system, wherein each process flow includes a plurality of nodes, one or more flows, and a flow between each of the plurality of nodes and at least one other node of the plurality of nodes;
  receiving a request to update a first process flow; and
  automatically rearranging the first process flow by:
   evaluating the first process flow including traversing of each node of the first process flow,
   establishing a level and coordinate position for each node of the first process flow,
   establishing a logical direction for each flow between the plurality of nodes of the first process flow, wherein the logical direction of a flow represents a direction that the process flow proceeds from a first node to a second node of the plurality of nodes, and
   generating a rearranged process flow based on the level and coordinate position for each node and the logical direction for each flow between the plurality of nodes of the first process flow.

18. The system of claim 17, wherein evaluating the first process flow further includes applying a modified depth first search (DFS).

19. The system of claim 18, wherein applying the modified DFS includes maintaining a traversing property indicating whether a subtree of the first process flow is currently being traversed.

20. The system of claim 19, wherein applying the modified DFS includes ending traversal of the subtree upon encountering a child node with the traversing property being true.

21. The system of claim 17, wherein rearranging the first process flow includes automatically processing one or more cyclic dependencies in the first processing flow.

* * * * *